United States Patent [19]
Baronosky

[11] Patent Number: 5,331,246
[45] Date of Patent: Jul. 19, 1994

[54] COIL ASSEMBLY RETAINER FOR ELECTRIC MOTOR

[75] Inventor: Richard A. Baronosky, Bristol, Conn.

[73] Assignee: Dana Corporation, Toledo, Ohio

[21] Appl. No.: 998,796

[22] Filed: Dec. 30, 1992

[51] Int. Cl.$^5$ ............................................. H02K 1/00
[52] U.S. Cl. .................................. 310/194; 310/179
[58] Field of Search ............... 310/103, 106, 179, 181, 310/187, 192, 194, 254, 256, 261, 264

[56] References Cited

U.S. PATENT DOCUMENTS

| | | | |
|---|---|---|---|
| 1,839,299 | 1/1932 | Cornu | 310/256 |
| 3,109,947 | 11/1963 | Thompson et al. | 310/52 |
| 3,551,715 | 12/1970 | Silvertown et al. | 310/254 |
| 3,909,648 | 9/1975 | Clark | 310/260 |
| 3,949,256 | 4/1976 | Cooper et al. | 310/260 |
| 4,347,493 | 8/1982 | Adams et al. | 310/194 |
| 4,350,914 | 9/1982 | Searle | 310/194 |
| 4,490,636 | 12/1984 | McBratney | 310/71 |
| 4,797,588 | 1/1989 | Capion | 310/54 |
| 4,912,353 | 3/1990 | Kondo et al. | 310/259 |
| 4,968,911 | 11/1990 | Denk | 310/42 |
| 4,968,912 | 11/1990 | Shahamat et al. | 310/71 |
| 5,068,563 | 11/1991 | Cummings | 310/194 |

*Primary Examiner*—Steven L. Stephan
*Assistant Examiner*—Matthew Nguyen

*Attorney, Agent, or Firm*—MacMillan, Sobanski & Todd

[57] ABSTRACT

A structure for retaining bobbin wound electromagnetic coil assemblies on the poles of an electric motor is disclosed. Each coil assembly includes a bobbin having an opening formed therein which defines an interior space within which the motor poles are received. The ends of the bobbin are formed having pairs of opposed flange portions, each of which is generally flat and rectangular in shape. The flange portions extend from the upper and lower sides of each end of the bobbin, defining generally U-shaped end portions. The inwardly facing surfaces of the flange portions are each formed having an outer tapered surface and an inner groove extending thereacross. Wire is wound about the exterior surface of the bobbin, extending between the opposed flange portions at the ends of the bobbin. A pair of coil retainers are provided for retaining the coil assemblies on their respective stator poles during use. The coil retainers are each formed from a flat sheet of rigid material. When installed, the coil retainers engage the grooves formed on the flange portions of the bobbins to support the coil assemblies on the poles of the motor. A cylindrical rotor assembly is supported concentrically within the stator for rotation relative thereto.

27 Claims, 4 Drawing Sheets

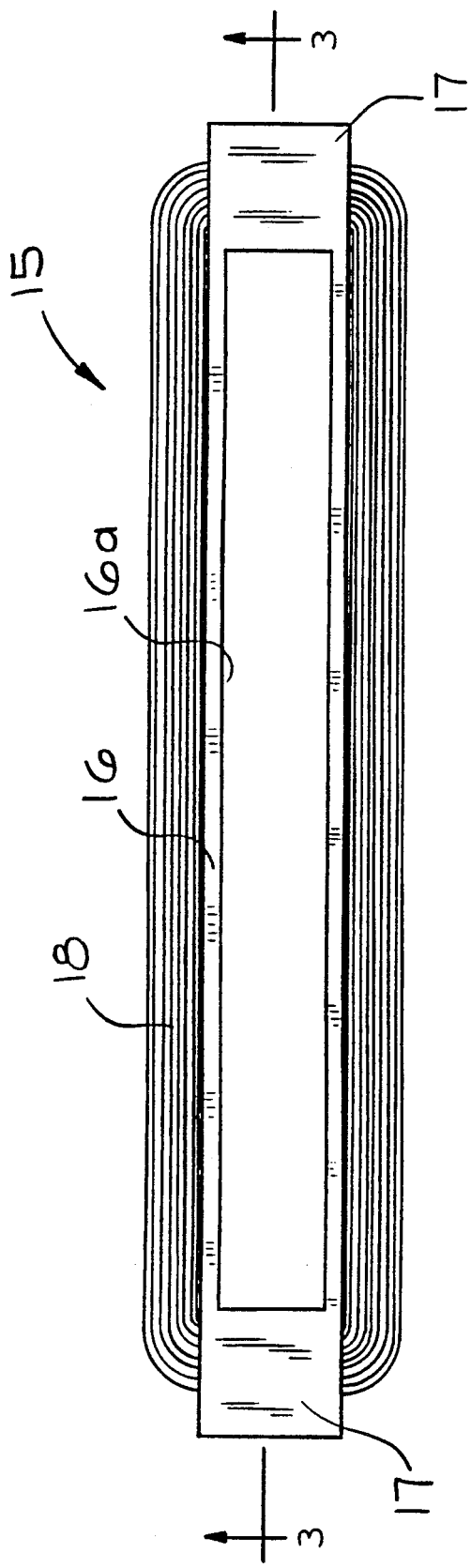
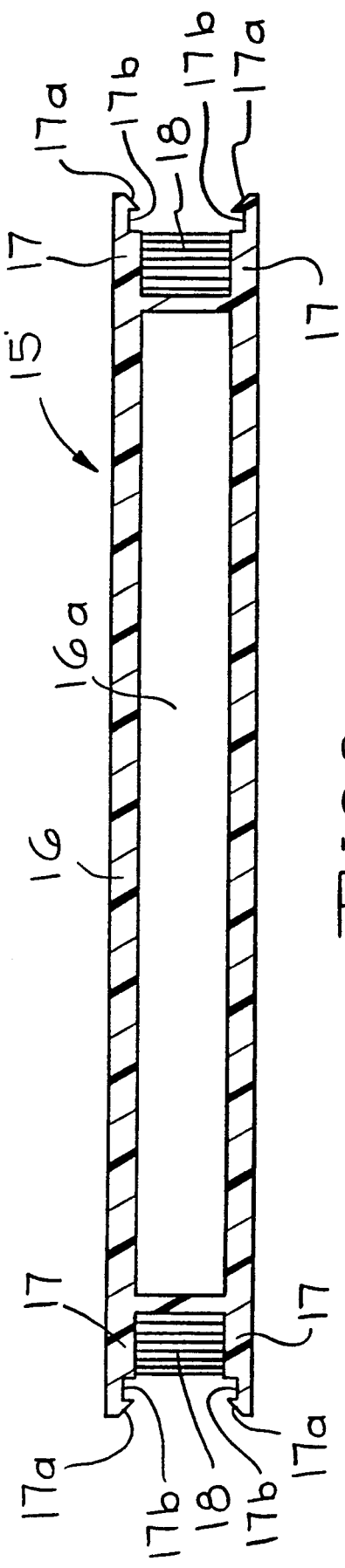
FIG.2
FIG.3

COIL ASSEMBLY RETAINER FOR ELECTRIC MOTOR

BACKGROUND OF THE INVENTION

This invention relates in general to electric motors and in particular to an improved structure for retaining a plurality of bobbin wound coil assemblies within such an electric motor. One specific application for this invention is in a variable reluctance electric motor, although the invention may be used in other electric motor structures as well.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. Consequently, the operating characteristics of electric motors vary from type to type, and certain types of electric motors are better suited for performing certain tasks than others.

Synchronous motors constitute one principal class of electric motors. The two basic components of a synchronous motor are (1) a stationary member which generates a rotating electromagnetic field, generally referred to as the stator, and (2) a rotatable member driven by the rotating magnetic field, generally referred to as the rotor. Synchronous motors are characterized in that the rotational speed of the rotor is directly related to the frequency of the electrical input signal applied thereto and, therefore, the rotational speed of the electromagnetic field generated thereby. Thus, so long as the frequency of the applied electrical input signal is constant, the rotor will be driven at a constant rotational speed. Within this broad definition, however, the structure and operation of synchronous electric motors vary widely.

One variety of synchronous electric motor is known as a variable reluctance motor. Variable reluctance motors operate on the principle that a magnetic field which is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from a magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

In a basic variable reluctance motor structure, this operation can be accomplished by providing a generally hollow cylindrical stator having a plurality of radially inwardly extending poles formed thereon. A coil or winding of an electrically conductive wire is provided about each of the stator poles. Concentrically within the stator, a cylindrical rotor is rotatably supported. The rotor is provided with a plurality of radially outwardly extending poles. However, no electrical conductor coils are provided on the rotor poles. By passing pulses of electrical current through each of the stator coils in a sequential manner, the stator poles can be selectively magnetized so as to attract the rotor poles thereto. Consequently, the rotor will rotate relative to the stator.

To optimize the operation of the variable reluctance motor, the magnitude of the electrical current which is sequentially passed through the stator coils is typically varied as a function of the rotational displacement of the rotor, as opposed to simply being supplied in an on-off manner. For example, the magnitude of the electrical current passed through a particular stator coil can initially be large, but decrease as the rotor pole rotates toward it. Consequently, the stator coil is prevented from continuing to attract the rotor pole toward it when the rotor pole has rotated to a position near or adjacent to the stator pole. This facilitates the rotation of the rotor at a more uniform speed.

As mentioned above, coils of electrically conductive wire are provided about each of the stator poles in a typical variable reluctance motor. In the past, these coils have been formed by winding the electrically conductive wire (which is coated with an electrically non-conductive insulator) about the poles of the stator. The wire used in such coils has typically been conventional wire having a circular cross sectional shape. While such wire is commonly available and relatively inexpensive, the circular cross sectional shape of the wire does not lend itself to high density winding. Also, a special winding machine must be provided to wind the wire about the poles of the stator within the electric motor.

More recently, it has been found desirable to form the wire used in such coils from insulated foil wire. Foil wire lends itself to higher density windings. Also, a special winding machine is not necessary because the foil wire can be wound on a mandrel outside of the electric motor, then installed therein. While electromagnetic coils formed from both round and foil wire have been effective, it would be desirable to provide an improved structure for an electric motor in which the coils are wound upon bobbins, and wherein an improved structure is provided for retaining these coils on the poles of an electric motor.

SUMMARY OF THE INVENTION

This invention relates to an improved structure for retaining bobbin wound electromagnetic coil assemblies on the poles of an electric motor, such as a variable reluctance electric motor. The motor includes a hollow cylindrical stator having a plurality of radially inwardly extending stator poles formed thereabout. An electromagnetic coil assembly is provided for each of the stator poles. Each of the coil assemblies includes a bobbin which is formed generally in the shape of a rectangular parallelepiped. A rectangular opening is formed in the bobbin which defines an open interior space. Each of the longitudinal ends of the bobbin is formed having a pair of opposed flange portions. Each of the flange portions is generally flat and rectangular in shape, extending longitudinally from the upper and lower sides of each end of the bobbin. Thus, the flange portions define generally U-shaped end portions at the longitudinal ends of the bobbin. The inwardly facing surfaces of the flange portions are each formed having an outer tapered surface and an inner groove extending thereacross. A length of wire is wound longitudinally about the exterior surface of the bobbin, extending between the opposed flange portions at the longitudinal ends of the bobbin. A pair of coil retainers are provided for retaining the coil assemblies on their respective stator poles during use. The coil retainers are each formed from a flat sheet of rigid material. When installed, the coil retainers engage the grooves formed on the flange portions of the bobbins and, thus, support the coil assemblies on the stator poles. A cylindrical rotor assembly is supported concentrically within the stator for rotation relative thereto.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a top plan view of the bobbin wound coil for the variable reluctance electric motor illustrated in FIG. 1.

FIG. 3 is a sectional elevational view of the bobbin wound coil taken along line 3—3 of FIG. 2.

DETAILED DESCRIPTION OF THE PREFERRED EMBODIMENT

Figure 1:
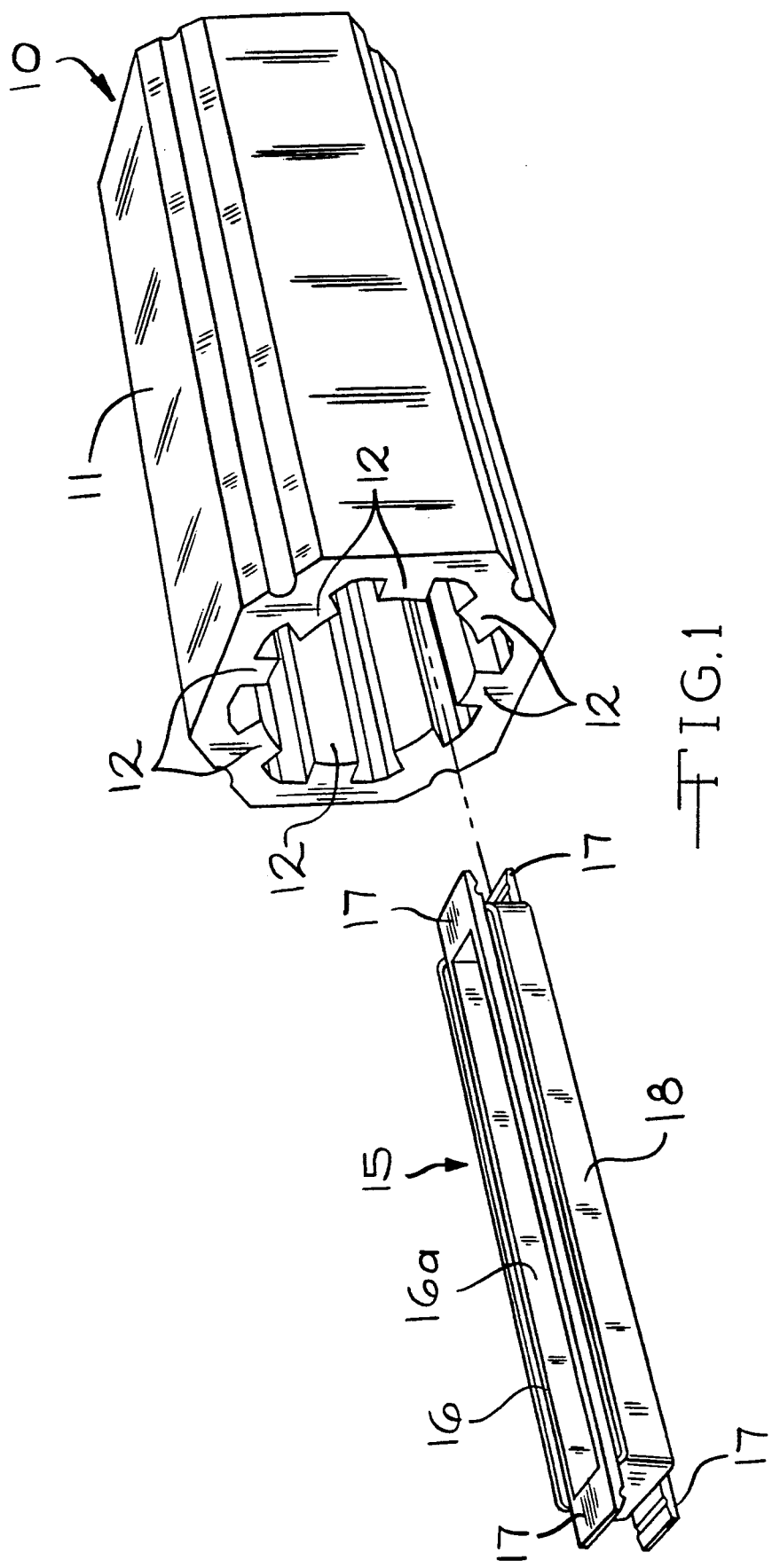
FIG. 1 is an exploded perspective view of a portion of variable reluctance electric motor in accordance with this invention.

Referring now to the drawings, there is illustrated in FIG. 1 a portion of a variable reluctance electric motor, indicated generally at 10, in accordance with this invention. Although the invention will be described and illustrated in the context of a variable reluctance electric motor 10, it will be appreciated that this invention may be used in conjunction with other well known electric motor structures. The motor 10 includes a stator 11 which is generally hollow and cylindrical in shape. A plurality of radially inwardly extending poles 12 are formed on the stator 11 and extend throughout the length thereof. The stator poles 12 are preferably provided in opposed pairs. Eight stator poles 12 are provided on the illustrated stator 11. However, a greater or lesser number of stator poles 12 may by provided.

Each of the stator poles 12 is generally rectangular in cross sectional shape. The radially innermost surfaces of the stator poles 12 are slightly curved so as to define an inner diameter. The stator 11 and the stator poles 12 are formed from a magnetically permeable material, such as iron. As will be explained below, each of the opposed pairs of stator poles represents one phase for energizing the variable reluctance motor 10 for operation.

An electromagnetic coil assembly, indicated generally at 15, is provided for each of the stator poles 12. One of such coil assemblies 15 is illustrated in FIGS. 1, 2, and 3. As shown therein, the coil assembly 15 includes a bobbin 16 which is formed generally in the shape of a rectangular parallelepiped. A rectangular opening 16a is formed through the central portion of the bobbin 16, defining an open interior space. The purpose for this rectangular opening 16a will be explained below. The bobbin 16 is preferably formed from an electrically non-conductive material, such as plastic.

Each of the longitudinal ends of the bobbin 16 is formed having a pair of opposed flange portions 17. As best shown in FIGS. 2 and 3, each of the flange portions 17 is generally flat and rectangular in shape, extending longitudinally from the upper and lower sides of each end of the bobbin 16. Thus, taken together, the flange portions 17 at each of the longitudinal ends of the bobbin 16 define respective generally U-shaped end portions. The inwardly facing surfaces of the flange portions 17 are each formed having an outer tapered surface 17a and an inner groove 17b extending thereacross. The purpose of these tapered surfaces 17a and grooves 17b will also be explained below.

A length of wire 18 is wound longitudinally about the exterior surface of the bobbin 16. As shown in FIGS. 1, 2, and 3, the wire 18 extends between the opposed flange portions 17 at each of the longitudinal ends of the bobbin 16. The wire 18 has start and finish leads (not shown) for connecting it to a circuit for selectively supplying electrical current thereto, as will be explained below. In the illustrated embodiment, the wire 18 is shown as foil wire. However, the wire 18 may be formed having any desired cross sectional shape, such as circular or square.

Figure 4:
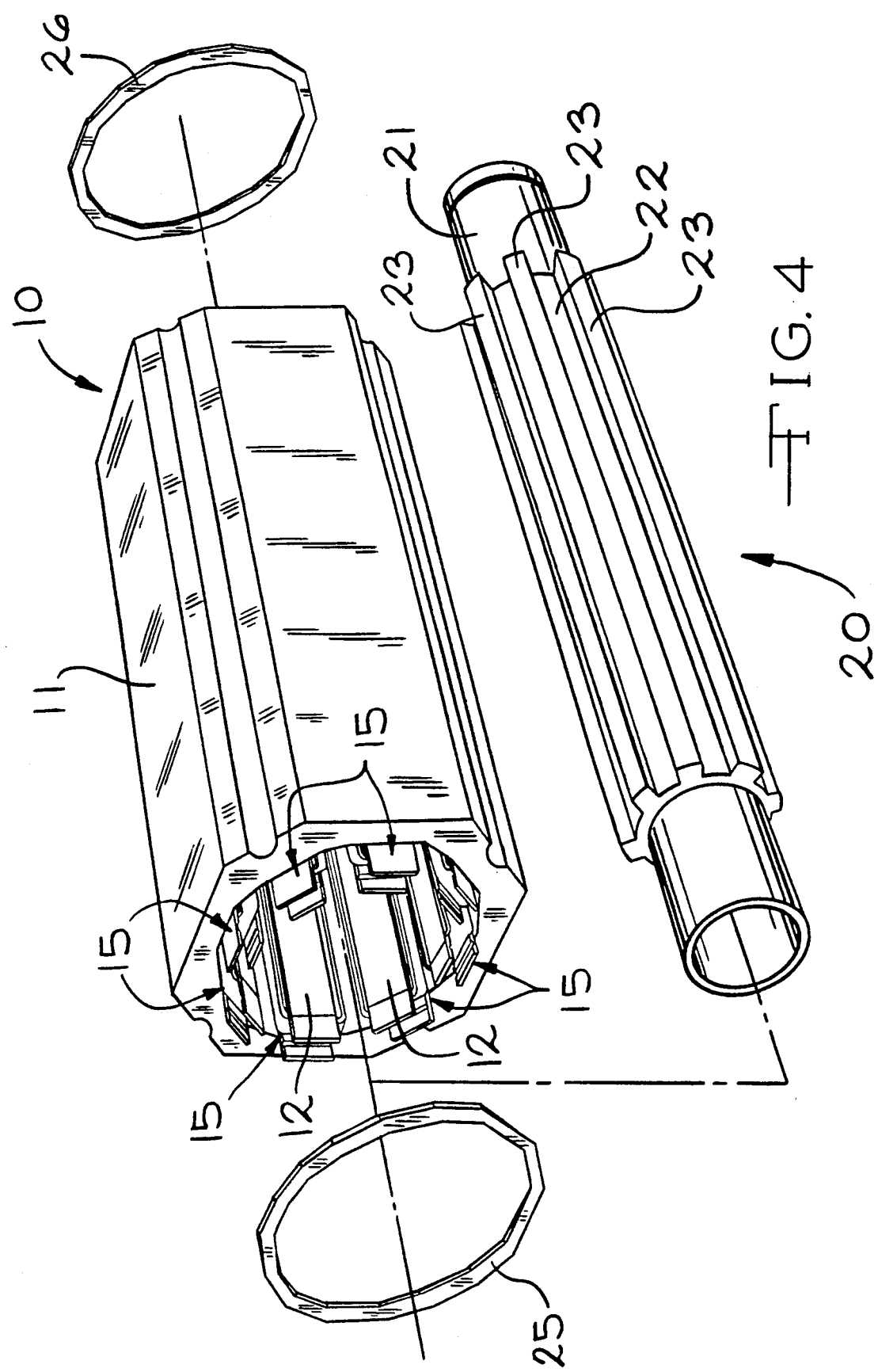
FIG. 4 is an exploded perspective view of the variable reluctance electric motor showing all of the bobbin wound coils assembled into the stator and the coil retainers of this invention.

Referring now to FIG. 4, the motor 10 is shown in a partially assembled condition. As shown therein, one of the coil assemblies 15 is disposed about each of the stator poles 12 of the motor 10. Thus, in the illustrated embodiment, eight of the coil assemblies 15 are provided for the eight stator poles 12. The rectangular openings 16a formed through the bobbins 16 are sized to fit snugly about the stator poles 12 upon which they are mounted.

As also shown in FIG. 4, a cylindrical rotor assembly, indicated generally at 20, is provided in the motor 10. The rotor assembly 20 is co-axially supported within the stator 11 for relative rotational movement by any conventional means. For example, the rotor assembly 20 may be supported by conventional bearings (not shown) mounted in conventional end bells (not shown) secured to the longitudinal ends of the stator 11. The rotor assembly 20 includes a generally cylindrical shaft 21 which may, as shown in the illustrated embodiment, be hollow. A rotor 22 is secured to the shaft 21 for rotation therewith. The rotor 22 is secured to the shaft 21 by a spline (not shown) or other means. Thus, the shaft 21 and the rotor 22 rotate together as a unit.

Figure 5:
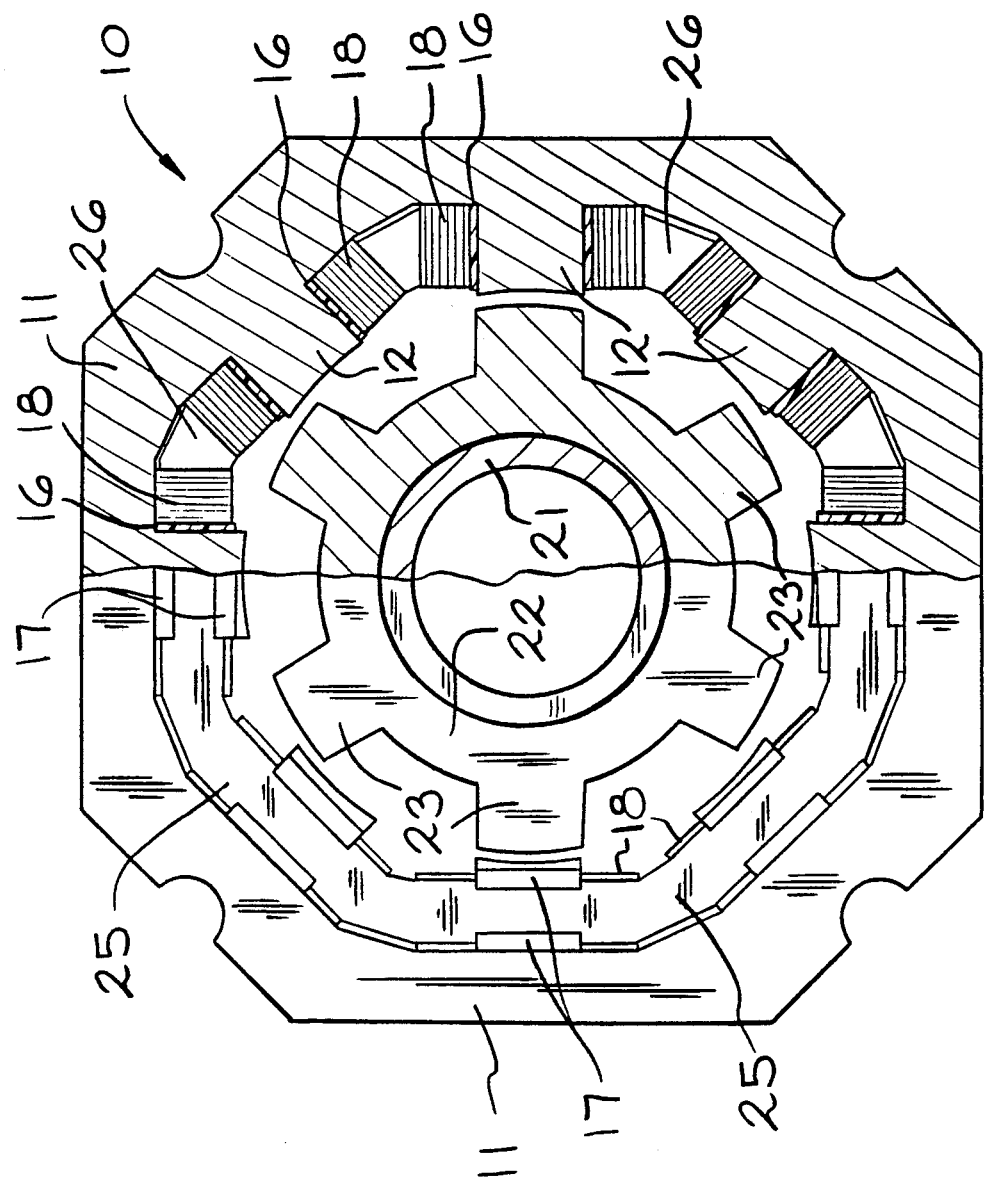
FIG. 5 is an end elevational, partially in cross section, of the assembled variable reluctance electric motor illustrated in FIG. 4.

A plurality of poles 23 is formed on the outer surface of the rotor 22. Each of the rotor poles 23 extends radially outwardly from the outer surface of the rotor 22 and is formed having a generally rectangular cross sectional shape. The rotor poles 23 extend longitudinally throughout the entire length of the outer surface of the rotor 22. The radially outermost surfaces of the rotor poles 23 are curved so as to define an outer diameter which is slightly smaller than the inner diameter defined by the radially innermost curved surfaces of the stator poles 12. Thus, a small air gap is defined between the stator poles 12 and the rotor poles 23, as shown in FIG. 5. As with the stator poles 12, the rotor poles 23 are preferably provided in opposed pairs. Six rotor poles 23 are provided on the illustrated rotor assembly 20. However, a greater or lesser number of rotor poles 23 may by provided. Usually, the number of rotor poles 23 is different from the number of stator poles 12. As with the stator 10, the rotor 22 and the rotor poles 23 can be formed from a magnetically permeable material, such as iron.

Means are provided for retaining the coil assemblies 15 on their respective stator poles 12 during use. As shown in FIGS. 4 and 5, this retaining means includes a pair of coil retainers 25 and 26. The coil retainers 25 and 26 are identical in structure, each being formed from a flat sheet of rigid material, such as plastic. In the illustrated embodiment, the coil retainers 25 and 26 are generally octagonal in shape, with each of the eight sides of the coil retainers 25 and 26 corresponding to each of the eight coil assemblies 15 provided on the stator poles 12. The outer dimensions of the coil retainers 25 and 26 are preferably slightly larger than the distance separating the inwardly facing surfaces of the flange portions 17 of the bobbin 16, but slightly smaller than the distance separating the bottom surfaces of the grooves 17b formed therein. The thicknesses of the coil retainers 25 and 26 are preferably approximately equal to widths of the grooves 17b formed in the flange portions 17 of the bobbin 16.

The forward coil retainer 25 is installed within the forward end of the motor 10 by moving it axially rearwardly toward the stator 11 having the coil assemblies 15 mounted therein. As the coil retainer 25 is installed, it initially engages the tapered surfaces 17a of the flange portions 17. Further axial movement of the coil retainer 25 causes it to flex the ends of the flange portions 17 slightly outwardly apart from one another. When the coil retainer 25 is moved axially a sufficient distance, it will snap into engagement with the grooves 17b formed on the flange portions 17, as shown in FIG. 5. The rearward coil retainer 26 is similarly installed within the rearward end of the motor 10 by moving it axially forwardly toward the stator 11.

When both of the coil retainers 25 and 26 are installed within the motor 10 as shown in FIG. 5, they engage all of the coil assemblies 15 provided on the stator poles 12. As a result, such coil assemblies 15 are retained in position on their respective stator poles 12 during operation of the motor 10. The grooves 17b prevent the coil retainers 25 and 26 from becoming dislodged accidentally. However, the coil retainers 25 and 26 can be easily removed if desired simply by flexing the ends of the flange portions 17 slightly outwardly apart from one another.

The operation of the motor 10 is conventional in the art. The coil assemblies 15 mounted on the stator poles 12 are connected in opposed pairs an electrical current pulse generating circuit, either in series or in parallel. The current pulse generating circuit is conventional in the art and is adapted to selectively generate pulses of electrical current through each of the pairs of coil assemblies 15. The timing and magnitude of the electrical current pulses generated by the current pulse generating circuit is usually determined by the rotational position of the rotor 22 relative to the stator 11. To accomplish this, a conventional sensor (not shown) may be provided which generates a signal which is representative of such relative rotational position. The current pulse generating circuit is responsive to this rotor position signal for generating the current pulses to the various pairs of coil assemblies 15 of the motor 10 in a predetermined manner. As a result, the rotor 22 is rotatably driven relative to the stator 11. Alternatively, the rotor position sensor may be omitted, and the current pulse generating circuit may be activated by a conventional phase sequencer (not shown) which operates independently of the rotational position of the rotor 22.

When electrical current is supplied to the coil assemblies 15 by the current pulse generating circuit, both the stator 11 and the rotor 22 become magnetized. The electrical wires 18 on each pair of the coil assemblies 15 windings 15 are oppositely wound such that one stator pole 12 is energized to become a magnetic north pole, while the opposite stator pole 12 is energized to become a magnetic south pole. As a result, a magnetic circuit is created between these opposed stator poles 12. Consequently, magnetic flux (lines of force) are created between the north and south stator poles 12. The magnetic flux passes from the north stator pole 12 through the nearest rotor pole 23, through the body of the rotor 22, and from the opposed rotor pole 23 to the south stator pole 12. The magnetic circuit between the north and south stator poles 12 is completed through the outer annular portion of the stator 11.

The resistance to the passage of magnetic flux from the north stator pole 12 to the nearest rotor pole 23 (and similarly from the south stator pole 12 to the nearest rotor pole 23) is referred to as reluctance, as discussed above. The magnitude of this reluctance changes with the rotational position of the rotor poles 23 relative to the stator poles 12. Reluctance is at a minimum when the rotor poles 23 are radially aligned with the stator poles 12. Consequently, the generation of the magnetic circuit described above produces a torque which tends to align the opposed rotor poles 23 with the energized opposed stator poles 12.

To effect rotation of the rotor assembly 20 relative to the stator 11, the first opposed pair of coil assemblies 15 on the stator poles 12 is turned off, and the next pair of coil assemblies 15 on the adjacent opposed pair stator poles 12 is turned on. As a result, the adjacent opposed pair of stator poles 12 is energized to become magnetic north and south poles. Such energization attracts the nearest rotor poles 23 to become aligned with the newly energized stator poles 12. Consequently, the rotor assembly 20 is rotated relative to the stator 11. To continue such rotation of the rotor assembly 20, the opposed pairs of stator poles 12 are sequentially energized in this manner, thus sequentially attracting the rotor poles 23 thereto. As a result, the rotor assembly 20 rotates relative to the stator 11 in a direction (counterclockwise, for example) which is opposite to the direction (clockwise) in which the stator pole pairs 12 are energized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, as mentioned above, this invention may be used in conjunction with electric motor structures other than variable reluctance electric motors. In such other motors, coil assemblies may be provided on the rotor poles 23. In this instance, the coil retainers 25 and 26 of this invention may be used to retain the coil assemblies on such rotor poles 23, either alone or in addition to retaining similar coil assemblies 15 on the stator poles 12, as described above.

What is claimed is:

1. An electric motor comprising:
a hollow stator having a plurality of radially inwardly extending stator poles formed thereon;
a rotor assembly supported within said stator for rotation relative thereto, said rotor assembly having a plurality of radially outwardly extending rotor poles formed thereon;

an electromagnetic coil assembly disposed about at least one of said stator and rotor poles, said electromagnetic coil assembly including a bobbin disposed about said one of said stator and rotor poles and an electromagnetic coil disposed about said bobbin, said bobbin including at least one flange portion extending outwardly therefrom; and means engaging said outwardly extending flange portion for retaining said bobbin about said one of said stator and rotor poles.

2. The electric motor defined in claim 1 wherein said flange portion is formed having a surface which is tapered as it extends outwardly from said bobbin.

3. The electric motor defined in claim 1, wherein said flange portion is formed having a groove, said means for retaining extending into said groove to retain said bobbin about said one of said stator and rotor poles.

4. The electric motor defined in claim 1 wherein said bobbin includes a pair of opposed flange portions extending therefrom, said means for retaining engaging said pair of opposed flange portion to retain said bobbin about said one of said stator and rotor poles.

5. The electric motor defined in claim 4 wherein a portion of said electromagnetic coil extends between said pair of opposed flange portions.

6. The electric motor defined in claim 4 wherein at least one of said opposed flange portions is formed having a surface which is tapered as it extends outwardly from said bobbin.

7. The electric motor defined in claim 4 wherein at least one of said opposed flange portions is formed having a groove, said means for retaining extending into said groove to retain said bobbin about said one of said stator and rotor poles.

8. The electric motor defined in claim 4 wherein both of said opposed flange portions are formed having a surface which is tapered as it extends outwardly from said bobbin.

9. The electric motor defined in claim 4 wherein both of said opposed flange portions are formed having a groove, said means for retaining extending into said grooves to retain said bobbin about said one of said stator and rotor poles.

10. The electric motor defined in claim 1 wherein said means for retaining includes a retainer which is generally flat and annular in shape.

11. The electric motor defined in claim 1 wherein an electromagnetic coil assembly is disposed about each of said plurality of stator poles, each of said electromagnetic coil assemblies including a bobbin disposed about an associated one of said stator poles and an electromagnetic coil disposed about said bobbin, each of said bobbins including at least one flange portion extending outwardly therefrom, said means for retaining engaging all of said flange portions on said bobbins to retain them about said stator poles.

12. The electric motor defined in claim 11 wherein each of said flange portions is formed having a surface which is tapered as it extends outwardly from said bobbin.

13. The electric motor defined in claim 11 wherein each of said flange portions is formed having a groove, said means for retaining extending into all of said grooves to retain said bobbins about said stator poles.

14. The electric motor defined in claim 11 wherein each of said bobbin includes an end having a pair of opposed flange portions extending outwardly therefrom, said means for retaining engaging all of said pairs of opposed flange portions to retain said bobbins about said stator poles.

15. The electric motor defined in claim 1 wherein an electromagnetic coil assembly is disposed about each of said plurality of rotor poles, each of said electromagnetic coil assemblies including a bobbin disposed about an associated one of said rotor poles and an electromagnetic coil disposed about said bobbin, each of said bobbins including at least one flange portions extending outwardly therefrom, said means for retaining engaging all of said flange portion on said bobbins to retain them about said rotor poles.

16. The electric motor defined in claim 15 wherein each of said flange portions is formed having a surface which is tapered as it extends outwardly from said bobbin.

17. The electric motor defined in claim 15 wherein each of said flange portions is formed having a groove, said means for retaining extending into all of said grooves to retain said bobbins about said rotor poles.

18. The electric motor defined in claim 15 wherein each of said bobbins includes an end having a pair of opposed flange portions extending outwardly therefrom, said means for retaining engaging all of said pairs of opposed flange portions to retain said bobbins about said rotor poles.

19. An electromagnetic coil assembly comprising:
a bobbin having an opening formed therethrough defining an axis and a pair of axial end portions, said bobbin being elongated in a direction which is said axial end portions having respective flange portions which extend outwardly therefrom in opposing relationship, said flange portions having respective surface which face one another and which extend from respective innermost ends adjacent to said bobbin to respective outermost ends, the axial distance between said innermost ends of said surfaces being less than the axial distance between said outermost end of said surfaces; and
an electromagnetic coil disposed about said bobbin.

20. The electromagnetic coil assembly defined in claim 19 wherein one of said surfaces is tapered relative to a plane extending perpendicular to said axis.

21. The electromagnetic coil assembly defined in claim 19 wherein both of said surfaces are tapered relative to a plane extending perpendicular to said axis.

22. The electromagnetic coil assembly defined in claim 19 wherein each of said flange portions is generally flat and rectangular in shape.

23. An electromagnetic coil assembly comprising:
a bobbin having an opening formed therethrough defining an axis and a pair of axial end portions, said bobbin being elongated in a direction which is transverse to said axis, each of said axial end portions having respective flange portions which extend outwardly therefrom in opposing relationship, said flange portions having respective surfaces which face one another, a groove being formed in one of said surfaces; and
an electromagnetic coil disposed about said bobbin.

24. The electromagnetic coil assembly defined in clam 23 wherein a groove is formed in both of said surfaces.

25. The electromagnetic coil assembly defined in claim 23 wherein said surfaces extend from respective innermost ends to respective outermost ends, the axial distance between said innermost ends of said surfaces being less than the axial distance between said outermost end of said surfaces.

26. The electromagnetic coil assembly defined in claim 25 wherein one of said surfaces is tapered relative to a plane extending perpendicular to said axis.

27. The electromagnetic coil assembly defined in claim 25 wherein both of said surfaces are tapered relative to a plane extending perpendicular to said axis.

* * * * *

UNITED STATES PATENT AND TRADEMARK OFFICE
CERTIFICATE OF CORRECTION

PATENT NO. : 5,331,246
DATED : July 19, 1994
INVENTOR(S) : Richard A. Baronosky It is certified that error appears in the above-identified patent and that said Letters Patent is hereby corrected as shown below:

| | |
|---|---|
| Column 7, Claim 4, line 3, | after "tending", insert -- outwardly --. |
| Column 7, Claim 4, line 4, | after "flange", change "portion" to -- portions --. |
| Column 7, Claim 14, line 2, | after "said", change "bobbin" to --bobbins --. |
| Column 8, Claim 15, line 7, | after "flange", change "portions" to -- portion --. |
| Column 8, Claim 15, line 9, | after "flange", change "portion" to -- portions --. |
| Column 8, Claim 19, line 4, | after "is", insert -- transverse to said axis, each of --. |
| Column 8, Claim 19, line 8, | after "respective", change "surface" to -- surfaces --. |

Signed and Sealed this

Twenty-seventh Day of September, 1994

Attest:

BRUCE LEHMAN

*Attesting Officer*     *Commissioner of Patents and Trademarks*